(12) United States Patent
Sheppard et al.

(10) Patent No.: US 9,743,141 B2
(45) Date of Patent: Aug. 22, 2017

(54) METHODS AND APPARATUS TO DETERMINE VIEWING CONDITION PROBABILITIES

(71) Applicant: The Nielsen Company (US), LLC, New York, NY (US)

(72) Inventors: Michael Sheppard, Brooklyn, NY (US); Jonathan Sullivan, Natick, MA (US); Peter Lipa, Tucson, AZ (US); Alejandro Terrazas, Santa Cruz, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/737,824

(22) Filed: Jun. 12, 2015

(65) Prior Publication Data

US 2016/0366480 A1    Dec. 15, 2016

(51) Int. Cl.
*H04H 60/43* (2008.01)
*H04N 21/466* (2011.01)
*H04N 21/258* (2011.01)
*H04N 21/442* (2011.01)
*H04N 21/25* (2011.01)

(52) U.S. Cl.
CPC ....... *H04N 21/4663* (2013.01); *H04N 21/252* (2013.01); *H04N 21/25883* (2013.01); *H04N 21/44218* (2013.01); *H04N 21/44222* (2013.01); *H04N 21/4661* (2013.01); *H04N 21/4667* (2013.01)

(58) Field of Classification Search
CPC combination set(s) only.
See application file for complete search history.

(56) References Cited

U.S. PATENT DOCUMENTS

| | | | |
|---|---|---|---|
| 4,769,697 A | 9/1988 | Gilley et al. | |
| 5,512,934 A * | 4/1996 | Kochanski | H04N 7/17318 348/E7.071 |
| 6,954,745 B2 | 10/2005 | Rajan | |
| 7,062,510 B1 | 6/2006 | Eldering | |
| 7,739,140 B2 | 6/2010 | Vinson et al. | |
| 7,954,120 B2 | 5/2011 | Roberts et al. | |
| 8,046,797 B2 | 10/2011 | Bentolila et al. | |
| 8,495,680 B2 | 7/2013 | Bentolila et al. | |

(Continued)

OTHER PUBLICATIONS

Green, "Reversible jump Markov chain Monte Carlo computation and Bayesian model determination," Biometrika vol. 82, No. 4, Jun. 1995 (22 pages).

(Continued)

*Primary Examiner* — Kieu Oanh T Bui
(74) *Attorney, Agent, or Firm* — Hanley, Flight & Zimmerman, LLC (57) ABSTRACT

Methods, apparatus, systems and articles of manufacture are disclosed for a viewing condition probability calculator. The viewing condition probability calculator enumerates a list of all viewing combinations for a tuning event, for a number of people N at a location. A probability for each of the viewing combinations is determined, using an independent probability of viewing for each of the N people at the location. A probability of a viewing condition is determined using the probabilities of a first set of viewing combinations that have a first common characteristic.

35 Claims, 4 Drawing Sheets

(56) References Cited

U.S. PATENT DOCUMENTS

| | | |
|---|---|---|
| 8,543,454 B2 | 9/2013 | Fleischman et al. |
| 8,739,197 B1 | 5/2014 | Pecjak et al. |
| 8,904,418 B1 | 12/2014 | Rowe et al. |
| 8,984,547 B2 | 3/2015 | Lambert et al. |
| 9,204,188 B1 | 12/2015 | Mirisola et al. |
| 9,277,265 B2 | 3/2016 | Wood et al. |
| 2004/0181818 A1 | 9/2004 | Heyner et al. |
| 2006/0168613 A1 | 7/2006 | Wood et al. |
| 2007/0271580 A1 | 11/2007 | Tischer et al. |
| 2011/0016485 A1 | 1/2011 | Hubner et al. |
| 2013/0262181 A1 | 10/2013 | Topchy et al. |
| 2014/0150003 A1 | 5/2014 | Doe |
| 2014/0181851 A1 | 6/2014 | Givon et al. |
| 2014/0337868 A1 | 11/2014 | Garza et al. |
| 2014/0358630 A1 | 12/2014 | Bhagat et al. |
| 2014/0379421 A1 | 12/2014 | Shankar et al. |
| 2014/0380348 A1 | 12/2014 | Shankar et al. |
| 2014/0380349 A1 | 12/2014 | Shankar et al. |
| 2014/0380350 A1 | 12/2014 | Shankar et al. |
| 2015/0089523 A1 | 3/2015 | Volovich et al. |
| 2015/0186510 A1 | 7/2015 | Svendsen et al. |
| 2015/0262201 A1 | 9/2015 | Rao et al. |
| 2016/0165277 A1 | 6/2016 | Kirillov et al. |
| 2016/0165287 A1 | 6/2016 | Wood et al. |

OTHER PUBLICATIONS

Mora et al., "Television Co-Viewing in Mexico: An Assessment on People Meter Data," Dec. 1, 2011, 24 pages, Journal of Broadcasting & Electronic Media.

Seltman, "Experimental Design and Analysis: Chapter 3—Review of Probability," Nov. 1, 2009, 42 pages.

Reddy, "Applied Data Analysis and Modeling for Energy Engineers and Scientists: Chapter 2—Probability Concepts and Probability Distributions," 2011, 35 pages.

U.S. Appl. No. 14/569,474, filed Dec. 12, 2014, 81 pages.

"Set Top Box Video on Demand Dynamic Advertisement Insertion," retrieved on Jun. 17, 2015, 17 pages.

U.S., "Non-Final office action", issued in connection with U.S. Appl. No. 15/196,742, dated May 19, 2017, 34 pages.

\* cited by examiner

METHODS AND APPARATUS TO DETERMINE VIEWING CONDITION PROBABILITIES

FIELD OF THE DISCLOSURE

This disclosure relates generally to media monitoring, and, more particularly, to methods and apparatus to determine viewing condition probabilities.

BACKGROUND

Media content providers and/or metering entities such as, for example, advertising companies, broadcast networks, etc. are often interested in the viewing, listening, and/or media behavior interests of audience members and/or the public in general. To collect these behavior interests, an audience measurement company may enlist panelists (e.g., persons agreeing to have their media exposure habits monitored) to cooperate in an audience measurement study. The viewing habits of these panelists as well as demographic data about the panelists is collected and used to statistically determine (e.g., project, estimate, etc.) the size and demographics of a larger viewing audience.

The demographic information for a panelist household is collected when the panelists are enlisted. The demographic information typically includes the number of people in the household, the age category of the different people and their gender (e.g. male or female).

DETAILED DESCRIPTION

When media is presented by a media presentation device, the event may be known as a tuning event, a viewing event, or a media presentation event. When measuring the demographics for a tuning event with a number of people at the location, determining which of the people at the location viewed the tuning event is difficult.

In some environments, for example at a panelist household, the number of people in the household are known because all the members of the household are registered when the household agrees to be panelists. The independent probability of viewing an event is also known for each person in the household. The independent probability of viewing for each person in a household is determined when the household registers as panelists. The independent probability of viewing for each person is based on the person's age, gender, education, the household size and the location of the household and the like. The independent probability of viewing can be developed by evaluating the viewing habits of the people in a set of households over a given time period to determine the viewing probabilities for a given type of person. The independent probability of viewing and is associated with the household.

Using the number of people in a household and the independent probability of viewing an event for each person, the probability of a viewing condition can be determined (under the assumption of independence as discussed below). A viewing condition is a list of the people that are watching the tuning event under a given set of conditions. A viewing condition may have any number of people (including zero) watching the viewing event. In most cases, the maximum number of people in a viewing condition is the number of people in a household. The given set of conditions may include a specific number of people viewing the event, a specific person viewing the event, combinations of the number of viewers and a specific viewer viewing the event, and the like. For example, assume that 3 people (Jim, Leslie and Richard) are in a household, an example viewing condition is that one person is viewing the tuning event. Another example viewing condition is that two specific people, for example Jim and Richard, are watching the tuning event. Yet another example viewing condition is that two people are watching the tuning event, given that one of them is Jim.

The methods and apparatus to determine viewing condition probabilities enumerates each viewing combination for the number of people registered/known to be at a location. Then the probability for each of the viewing combination is calculated using the known independent probability of viewing for each person. The enumerated list of probabilities for each viewing combination can be combined in a number of different ways to determine the probability of a number of different viewing conditions.

For example, the probabilities for each of the viewer combinations can be used to determine an unconditional probability for how many viewers watched a tuning event. A normalized probability for a given combination of viewers, when the number of viewers at an event is known, cam be determined. A probability for how many people are watching, given that it is known that a specific person is watching, can be determined. Probabilities for additional viewing conditions may also be determined.

In some examples the probability of a viewing condition is determined using a first set of viewing combinations that have a common characteristic. The common characteristic may be the number of people watching the tuning event, specific people watching the tuning event, and the like. The probability of other viewing conditions may be determined using the first set of viewing combinations that have the first common characteristic and a second set of viewing combinations that have a second, different, common characteristic. In some examples, the first and/or the second set of viewing combination may contain only one member.

Figure 1:
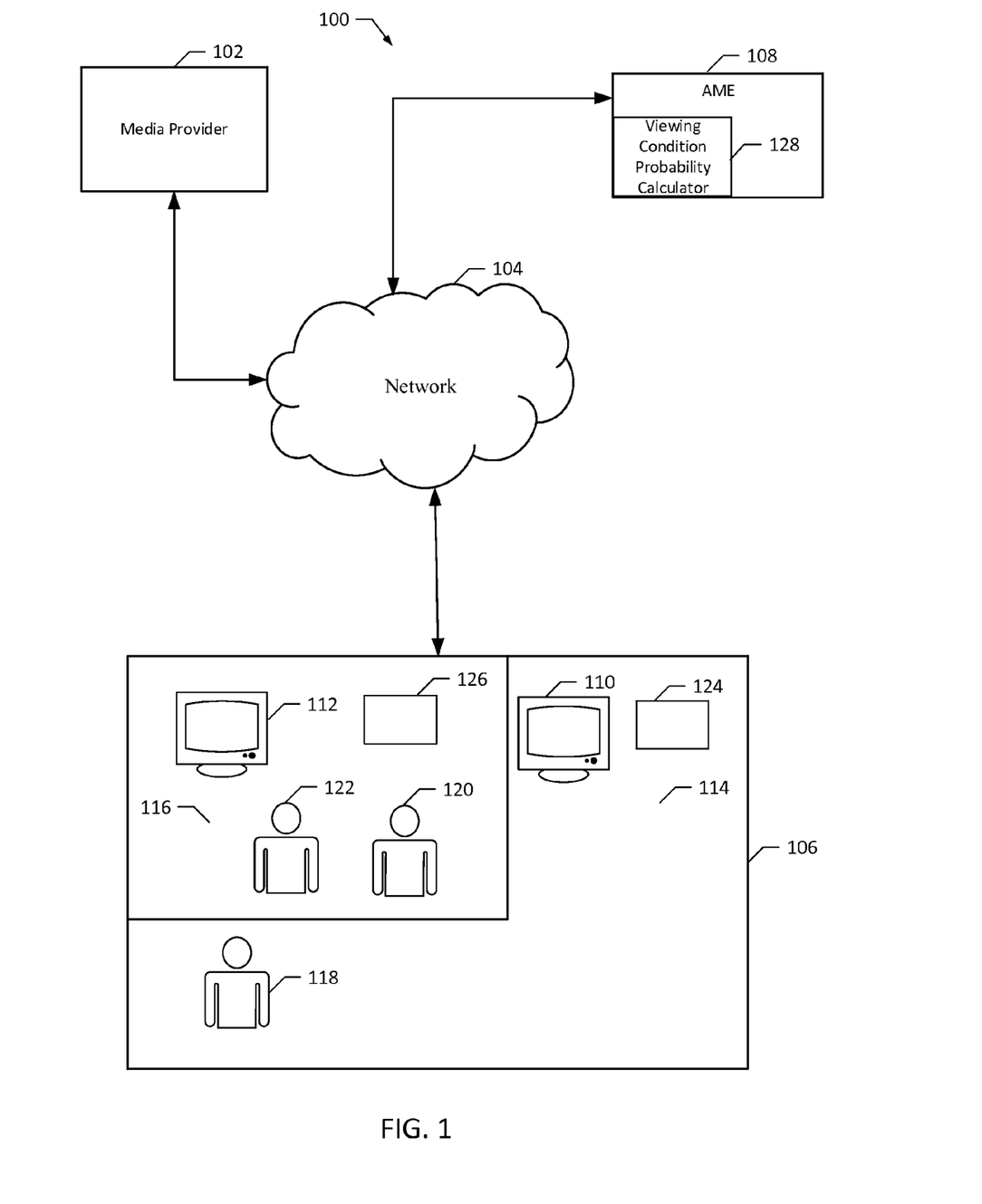
FIG. 1 is a diagram illustrating an example environment in which an example media monitor, including an example viewing condition probability calculator, operates.

FIG. 1 is a diagram illustrating an example environment 100 in which an example audience measurement entity (AME), including an example viewing condition probability calculator, operates. FIG. 1 includes a media provider 102, a network 104, a media presentation location 106, and an AME 108. The media provider 102, the media presentation location 106 and the AME 108 are communicatively coupled together through the network 104, for example the Internet.

The media provider 102 provides media to the media presentation location 106 through the network 104. As used herein, the term "media" includes any type of content and/or advertisement delivered via any type of distribution medium. Thus, media includes television programming or advertisements, radio programming or advertisements, movies, web sites, streaming media, etc.

The media presentation location 106 includes a number of media presentation devices, or media devices (two are shown, 110 and 112). The example media devices 110 and 112 of the illustrated example shown in FIG. 1 are devices that retrieve media from the media provider 102 for presentation. In some examples, the media devices 110 and 112 are capable of directly presenting media (e.g., via a display) while, in other examples, the media devices 110 and 112 presents the media on separate media presentation equipment (e.g., speakers, a display, etc.). Thus, as used herein "media devices" may or may not be able to present media without assistance from one or more additional devices. Media devices are typically consumer electronics. For example, the media devices 110 and 112 of the illustrated example are televisions, such as smart televisions.

While in the illustrated example, smart televisions are shown, any other type(s) and/or number(s) of media device(s) may additionally or alternatively be used. For example, personal computers such as a laptop computer, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), televisions, desktop computers, laptop computers, servers, etc. may additionally or alternatively be used.

The presentation location 106 has the first media device 110 in one location 114 and the second media device 112 in a different location 116 such that people viewing one of the media devices (110, 112) cannot view the other media device. In the example of FIG. 1, three people are located at the presentation location 106. One person 118 is located such that they cannot view either of the two media devices 110 and 112. The other two people 120 and 122 are located such that they can view the second media device 112 but cannot view the first media device 110. The people 118, 120, and 122 at the presentation location 106 can move around, so at any given time, any combination of viewers can occur at one of the media devices 110 and 112. For example, at a different time than shown in FIG. 1, one person 120 may be viewing media device 112 and the other two people, 118, 122 may be viewing media device 110.

Media presentation location 106 also includes media monitors 124 and 126. One of the media monitor 124 and 126 is located adjacent to each media device 110 and 112 (e.g. in locations 114 and 116). The media monitors 124 and 126 monitor the media being presented on media devices 110 and 112. In some examples, media monitors 124 and 126 also detect the number of people present at a media presentation from the media devices 110 and 112. In this example, the media monitors 124 and 126 are shown as separate devices. In other examples, the media monitors 124 and 126 may be integrated with the media devices.

The presentation location 106 can be any location that has media devices. For example, the presentation location 106 can be a retail store, a shopping mall, a restaurant, a wifi hot spot, a home, a panelist household or the like.

AME 108 tracks and stores tuning event information for each of the media devices 110 and 112 through network 104. In one example, AME 108 receives tuning event information from media monitors 124 and 126. In some examples, the media monitors 124 and 126 detect the number of people present during a tuning event. In some examples, the tuning event information includes: the media presented, the time the media was presented, the media device used, the number of people present at a viewing event, the independent probability of viewing for each person at the presentation location 106, and the like. In other examples, the independent probability of viewing for each person at the presentation location 106 is stored in the AME 108 and is associated with the household 106. The AME 108 stores the tuning event information in memory or onto a storage device, either local or remote.

In the illustrated example of FIG. 1, a viewing condition probability calculator 128 is located in the AME 108. In other examples, the viewing condition probability calculator 128 may be located remote from the AME 108 and communicatively coupled to the AME 108 through network 104.

The viewing condition probability calculator 128 accesses or obtains the tuning event information and the independent probability of viewing for each person at the presentation location 106, either from memory, from storage, or receives the information directly from the AME 108.

Using the tuning event information for each tuning event and the independent probability of viewing for each person at the presentation location 106, the viewing condition probability calculator 128 determines the probability for different viewing conditions (e.g. who is watching the tuning event). In some examples, the viewing condition probabilities are used to assign people to each viewing event. The viewing condition probability calculator 128 determines viewing condition probabilities by enumerating each combination of viewers for the number of people known to be at a location. The viewing condition probability calculator 128 determines the probability for each of the viewer combinations using the known independent probability of viewing for each person. The viewing condition probability calculator 128 can use the enumerated list of probabilities for each of the viewer combinations in a number of different ways to determine the probability of a number of different viewing conditions.

In some examples the probability of a viewing condition is determined using a first set of viewing combinations that have a common characteristic. The common characteristic may be the number of people watching, specific people watching the tuning event, and the like. The probability of other viewing conditions may be determined using the first set of viewing combinations that have the first common characteristic and a second set of viewing combinations that have a second, different, common characteristic. In some examples, the first and/or the second set of viewing combination may contain only one member.

For example, the probabilities for each of the viewer combinations can be used to determine: the unconditional probability of how many viewers watched a tuning event; the normalized probability of a given combination of viewers when the number of viewers at an event is known; the probability of how many people are watching given that it is known that a specific person is watching. Additional probabilities for different viewer combinations may also be determined.

Figure 2:
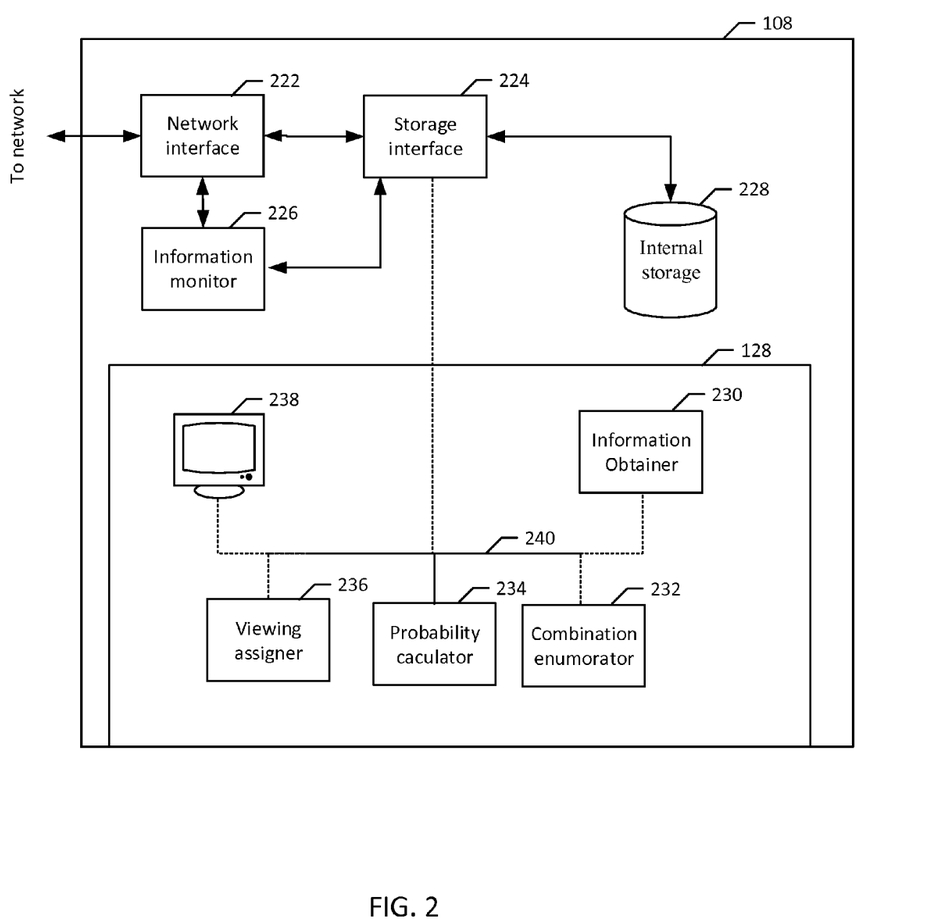
FIG. 2 is an example block diagram of the example media monitor and the example viewing condition probability calculator of FIG. 1.

FIG. 2 is an example block diagram of the example AME and the example viewing condition probability calculator of FIG. 1. AME 108 includes a network interface 222, a storage interface 224, an information monitor 226, internal storage 228 and a viewing condition probability calculator, for example the viewing condition probability calculator 124 from FIG. 1.

The viewing condition probability calculator 128 includes an information obtainer 230, a combination enumerator 232, a probability calculator 234, a viewing assigner 236, a display 238 and bus 240.

In some examples, the viewing condition probability calculator 128 is not integrated into the AME 108, but is a separate module/device. The separate module/device may be co-located with the AME 108 or may be remote from the AME 108. When the viewing condition probability calculator 128 is a separate module/device, the viewing condition probability calculator 128 may have additional modules, for example a network interface, a storage interface, and the like.

In the AME 108, the network interface 222 is communicatively coupled to a network, for example the network 104 of FIG. 1, the storage interface 224 and the information monitor 226. The storage interface 224 is communicatively coupled to the network interface 222, the information monitor 226, internal storage 228 and bus 240. The information monitor 226 is communicatively coupled to the network interface 222 and the storage interface 224.

In the viewing condition probability calculator 128, the information obtainer 230, the combination enumerator 232, the probability calculator 234, the viewing assigner 236 and the display 238 are communicatively coupled together over bus 240.

In operation, the information monitor 226 accesses the media devices 108 and 110 in the media presentation location 106 through network interface 222. The information monitor 226 tracks and stores tuning event information for each of the media devices 108 and 110. In some examples, the tuning event information includes: the media presented, the time the media was presented, the media device used, the number of people at each tuning event, the independent probability of viewing for each person at the presentation location 106, and the like. In other examples, the independent probability of viewing for each person at the presentation location 106 may not be included in the tuning event information for each media device, but may be calculated and saved independently.

The information monitor 226 stores the tuning event information in memory or onto a storage device, for example internal storage 228. The information monitor 226 stores the tuning event information onto internal storage 228 using the storage interface 224. In some examples, the information monitor 226 stores the tuning event information onto remote storage (not shown) through the storage interface 224 and the network interface 222.

In this example, the information obtainer 230, in the viewing condition probability calculator 128, accesses the tuning event information through the storage interface 224. The information obtainer 230 obtains one or more tuning events from the tuning event information. For each tuning event, the information obtainer 230 obtains the identity of the media device used for the tuning event, the media presentation location 106, the people registered at the media presentation location 106 and the independent probability of viewing for each person at the media presentation location 106. In some examples, the information obtainer 230 may obtain how many people were present at the tuning event.

The combination enumerator 232 obtains the identity of the media device used for the tuning event, the media presentation location 106 and the people at the media presentation location 106, from the information obtainer 230, either directly or indirectly from memory or storage.

For each tuning event, the combination enumerator 232 generates/enumerates a list or table of all the possible viewing combinations using the number of people at the media presentation location 106. When there are three people at the media presentation location 106, for example Jim, Leslie and Richard, there would be a total of eight different possible viewing combinations, as listed below:

| | |
|---|---|
| Viewing Combination 1 | No one is viewing |
| Viewing Combination 2 | Only Jim is viewing |
| Viewing Combination 3 | Only Leslie is viewing |
| Viewing Combination 4 | Only Richard is viewing |
| Viewing Combination 5 | Only Jim and Leslie are viewing |
| Viewing Combination 6 | Only Jim and Richard are viewing |
| Viewing Combination 7 | Only Leslie and Richard are viewing |
| Viewing Combination 8 | All three are viewing |

The probability calculator 234 obtains the list of viewing combinations from the combination enumerator 232, either directly or indirectly from memory or storage. The list of viewing combinations can be in a list format, a table format, or the like. The probability calculator 234 obtains the independent probability of viewing for each person at the media presentation location 106 from the information obtainer 230, either directly or indirectly from memory or storage.

The probability calculator 234 calculates the probability for each of the viewing combinations using the independent probability of viewing ($P_i$) for each person at the media presentation location 106. The probability for a given viewing combination is calculated as the product of the ($P_i$)s for each person present in the viewing combination multiplied by the product of one minus the ($P_i$)s for each person not present in the viewing combination. One minus the independent probability of viewing ($P_i$) for a person is equal to the independent probability of that person not viewing.

For example, when the independent probability of viewing for Jim, Leslie and Richard is A, B and C, respectively, the probability for Viewing Combination 6 (e.g. Jim and Richard viewing) from the table above, would be $A*(1-B)*C$. Filling out the table from the example above would result in the following probabilities for each viewing combination:

| | | |
|---|---|---|
| Viewing Combination 1 | No one | $(1 - A)*(1 - B)*(1 - C)$ |
| Viewing Combination 2 | Only Jim | $A*(1 - B)*(1 - C)$ |
| Viewing Combination 3 | Only Leslie | $(1 - A)*B*(1 - C)$ |
| Viewing Combination 4 | Only Richard | $(1 - A)*(1 - B)*C$ |
| Viewing Combination 5 | Only Jim and Leslie | $A*B*(1 - C)$ |
| Viewing Combination 6 | Only Jim and Richard | $A*(1 - B)*C$ |
| Viewing Combination 7 | Only Leslie and Richard | $(1 - A)*B*C$ |
| Viewing Combination 8 | All three are viewing | $A*B*C$ |

The probability calculator 234 uses the probabilities of multiple viewing combinations to determine the probability of a number of additional viewing conditions. In some examples the probability of a viewing condition is determined using a first set of viewing combinations that have a common characteristic. The common characteristic may be the number of people watching, specific people watching the tuning event, and the like. The probability of other viewing conditions may be determined using the first set of viewing combinations that have the first common characteristic and a second set of viewing combinations that have a second, different, common characteristic. In some examples, the first and/or the second set of viewing combination may contain only one member.

In some examples, the probability of viewing conditions that can be determined includes: the unconditional probability for a given number of viewers, the normalized probability for a first one of the viewing combination when a given number of the people N are viewing, the probability for a given number of people viewing when a first one of the N people is viewing, and the like. Additional viewing conditions can be calculated.

The unconditional probability for a given number of viewers is determined using a first set of viewing combinations that have a common characteristic. The common characteristic is the number of people watching (e.g. the number of viewers). The probability for each viewing combination in the set, having the given number of viewers, is summed to determine the probability for the viewing condition with the given number of viewers. Using the list from the example above, the unconditional probability for a tuning event having only two viewers is the sum of the probability for Viewing Combinations 5, 6 and 7 (each viewing combination having only two viewers). As such the unconditional probability for a tuning event having two viewers is equal to $[A*B*(1-C)]+[A*(1-B)*C]+[(1-A)*B*C]$.

The normalized probability for a first one of the viewing combination when a given number of the people N are viewing is determined using a first set of viewing combinations that have a first common characteristic and a second set of viewing combinations that have a second, different, common characteristic. The first common characteristic is the first viewing combination and the second common characteristic is the given number of people viewing. The normalized probability for the first one of the viewing combination when a given number of the people N are viewing is determined by dividing the probability of the first one of the viewing combination by the sum of the probability of each viewing combination for the given number of the people N viewing.

For example, using the table from above, if only one person is viewing, the probability that it is Leslie viewing can be determined The first viewing condition and the first common characteristic is that only Leslie is viewing. The given number of people viewing is 1, which is also the second common characteristic. Therefore the normalized probability for Leslie viewing is equal to the probability of Leslie viewing (Viewing Combination 3) divided by the sum of the probability of each viewing combination that has only one viewer (e.g. Viewing Combinations 2, 3 and 4). As such, the normalized probability for Leslie viewing when only one person is viewing is equal to $[(1-A)*B*(1-C)]/([A*(1-B)*(1-C)]+[(1-A)*B*(1-C)]+[(1-A)*(1-B)*C])$.

In another example, the probability that Jim and Richard are viewing, given that there are two viewers, can be determined. The first common characteristic is that Jim and Richard are viewing and the second common characteristic is that there are two viewers. The normalized probability for Jim and Richard viewing is equal to the probability of Viewing Combination 6 divided by the sum of the probability of each viewing combination that has two viewer (e.g. Viewing Combinations 5, 6 and 7).

The probability for a given number of people viewing when a given person is viewing is determined by summing the probability of each viewing combination with the given number of people viewing, including the given person viewing, divided by the sum of the probability of each viewing combination with the given person viewing.

For example, the probability of two people viewing, given that Jim is viewing, is equal to the sum of the viewing conditions where Jim is viewing and where there is one other person viewing (Viewing Combinations 6 and 7) divided by the sum of the probability of each Viewing Combination with Jim viewing (Viewing Combinations 4, 6, 7 and 8). The first common characteristic is that two people are viewing and one of the two is Jim and the second common characteristic is that Jim is viewing.

Once the probability calculator 234 has determined the probability of a viewing condition, the probability for that viewing condition is saved, for example in memory or in storage. The saved probability of a viewing condition may be used at a later time, or accessed by the viewing assigner 236.

The viewing assigner 236 obtains the probability of a viewing condition either directly from the probability calculator 234, or indirectly from memory or storage, for example the internal storage 228. The viewing assigner 236 assigns audience members to a viewing event based on the probability of a viewing condition. In some example, the viewing assigner 236 assigns the audience member with the highest probability of a viewing condition. In other examples, the viewing assigner 236 compares the probability of a viewing condition to a threshold, and assigns the audience member to the viewing event when the probability of a viewing condition is greater than the threshold. The viewing assigner 236 may display the probability of viewing conditions and/or the assignment of audience members to a viewing condition, on display 238.

When there are multiple media devices at a location, for example the presentation location 106 in FIG. 1, where there are two media devices 108 and 110, the information obtainer 230 will obtain the independent probability for viewing for each media device, for each person at the location. For example, when the three people (112, 114 and 116) at the presentation location 106 are Jim, Leslie and Richard, the independent probability of viewing for each media device may be as follows:

|                  | Jim       | Leslie    | Richard   |
|------------------|-----------|-----------|-----------|
| Not Watching     | 1 − (A + D) | 1 − (B + E) | 1 − (C + F) |
| Media device 108 | A         | B         | C         |
| Media device 110 | D         | E         | F         |

Where the independent probability of not watching is one minus the sum of the probability of watching for each of the other media devices, in this example, the two media devices. For simplification, the independent probability for not watching will be set to G, H and I, where G, H and I are equal to (1−(A+D)), (1−(B+E)), (1−(C+F)), respectively.

The combination enumerator 232 will enumerate the possible viewing combinations for all the media devices at the location for the given number of people at the location. Continuing with the example from above, a partial enumerated list for the two media devices 108 and 110 shown at the presentation location 106 in FIG. 1, would be as follows:

TABLE 1

| combination # | Jim | Leslie | Richard |
|---|---|---|---|
| 1 | 0 | 0 | 0 |
| 2 | 0 | 0 | 1 |
| 3 | 0 | 0 | 2 |
| 4 | 0 | 1 | 0 |
| 5 | 0 | 1 | 1 |
| 6 | 0 | 1 | 2 |
| 7 | 0 | 2 | 0 |
| 8 | 0 | 2 | 1 |
| 9 | 0 | 2 | 2 |

TABLE 1-continued

| combination # | Jim | Leslie | Richard |
|---|---|---|---|
| 10 | 1 | 0 | 0 |
| 11 | 1 | 0 | 1 |
| 12 | 1 | 0 | 2 |
| 13 | 1 | 1 | 0 |
| ... | ... | ... | ... |
| 26 | 2 | 2 | 1 |
| 27 | 2 | 2 | 2 |

Where the first column is a viewing combination number. The second column indicates which media device, if any, Jim is viewing. The third column indicates which media device, if any, Leslie is viewing. The fourth column indicates which media device, if any, Richard is viewing. A zero in a column indicates that the person is not watching a media device, a one in a column indicates the person is watching the first media device, for example media device 108, and a two in a column indicates that the person is watching the second media device, for example media device 110. For example, Viewing Combination 8 is Leslie viewing media device 110, Richard is viewing media device 108 and Jim is not viewing a media device.

The probability calculator 234 calculates the probability for each of the viewing combinations using the independent probability of viewing ($P_i$) for each person at the media presentation location 106. The probability for a given viewing combination is calculated as the product of the ($P_i$)s for each person present in the viewing combination multiplied by the product of one minus the ($P_i$)s for each person not present in the viewing combination. One minus the independent probability of viewing ($P_i$) for a person is equal to the independent probability of that person for not viewing.

For example, when the three people (112, 114 and 116) at the presentation location 106 are Jim, Leslie and Richard, the independent probability of viewing for each media device may be as follows:

|  | Jim | Leslie | Richard |
|---|---|---|---|
| Not Watching | G | H | I |
| Media device 108 | A | B | C |
| Media device 110 | D | E | F |

Where the independent probability for not watching is set to G, H and I, where G, H and I are equal to (1−(A+D)), (1−(B+E)), (1−(C+F)), respectively. The probability calculator 234 will calculate the probability of each of the enumerated viewing combinations. For example, using the partial table for the two media devices 108 and 110 above, the probability for viewing condition 6 (Jim not watching, Leslie watching media device 1 (media device 108), and Richard watching media device 2 (media device 110)) would be G*B*F. The probability for viewing condition 26 (Jim watching media device 2 (media device 110), Leslie watching media device 2 (media device 110), and Richard watching media device 1 (media device 108)) would be D*E*C.

The probability calculator 234 uses the probabilities of multiple viewing combinations to determine the probability of a number of additional viewing conditions. The additional viewing condition can be any condition relating to the listed viewing combinations. For example, the probability that exactly two people are watching media device 108, and no one is watching media device 110 can be determined.

In some examples the probability of a viewing condition is determined using a first set of viewing combinations that have a common characteristic. The common characteristic may be the number of people watching, specific people watching the tuning event, and the like. The probability of other viewing conditions may be determined using the first set of viewing combinations that have the first common characteristic and a second set of viewing combinations that have a second, different, common characteristic. In some examples, the first and/or the second set of viewing combination may contain only one member.

Using the partial table of viewing conditions (listed above) for two media devices, the probability that exactly two people are watching media device 108, and no one is watching media device 110 is the sum of the probabilities from Viewing Conditions 5, 11 and 13. As such, the probability for two people watching media device 108, and no one watching media device 110 is equal to (G*B*C)+(A*H*C)+(A*B*I). Viewing Conditions 5, 11 and 13 are the only viewing conditions that have two people watching media device 108 when no one is watching media device 110. The first common characteristic is that exactly two people are watching media device 108, and no one is watching media device 110.

Additional information about this viewing condition can be determined For example, given that exactly two people are watching media device 108, and no one is watching media device 110, the normalized probability for each of the three viewing conditions that meet this criteria can be determined. The three viewing conditions that meet the criteria are Viewing Conditions 5, 11 and 13. (e.g. Leslie and Richard watching media device 108 and Jim not watching, Jim and Richard watching media device 108 and Leslie not watching, Jim and Leslie watching media device 108 and Richard not watching).

The normalized probability for Leslie and Richard watching media device 108 and Jim not watching, given that exactly two people are watching media, is the probability of Viewing Combination 5 divided by the sum of the probabilities for Viewing Combinations 5, 11 and 13. As such, the normalized probability for Leslie and Richard watching media device 108 and Jim not watching, given that exactly two people are watching media, is equal to (G*B*C)/[(G*B*C)+(A*H*C)+(A*B*I)]. Each of the other normalized probability can be determined in a similar fashion. In this example, the first common characteristic is that Leslie and Richard are watching media device 108 and Jim is not watching a media device. The second common characteristic is that two people are watching media device 108 and no one is watching media device 110.

In another example of a viewing condition, the probability for how many people are watching any media device within the house, regardless of which media device, can be determined. For example, the probability that only one person is watching a media device is the sum of the probability of each viewing combination in which only one person is viewing a media device. As such, the probability that one person is watching is the sum of the probabilities of Viewing Combinations 2, 3, 4, 7, 10 and 19 (Row 19 is not shown in table 1, but is equal to [2 0 0]).

While an example manner of implementing the viewing condition probability calculator 128 of FIG. 1 is illustrated in FIG. 2, one or more of the elements, processes and/or devices illustrated in FIG. 2 may be combined, divided, re-arranged, omitted, eliminated and/or implemented in any other way. Further, the example information obtainer 230, the combination enumerator 232, the probability calculator 234, the viewing assigner 236 and/or, more generally, the example viewing condition probability calculator 128 of FIG. 1 may be implemented by hardware, software, firmware and/or any combination of hardware, software and/or firmware. Thus, for example, any of the example information obtainer 230, the combination enumerator 232, the probability calculator 234, the viewing assigner 236 and/or, more generally, the example viewing condition probability calculator 128 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, information obtainer 230, the combination enumerator 232, the probability calculator 234 and/or the viewing assigner 236 is/are hereby expressly defined to include a tangible computer readable storage device or storage disk such as a memory, a digital versatile disk (DVD), a compact disk (CD), a Blu-ray disk, etc. storing the software and/or firmware. Further still, the example viewing condition probability calculator 128 of FIG. 1 may include one or more elements, processes and/or devices in addition to, or instead of, those illustrated in FIG. 2, and/or may include more than one of any or all of the illustrated elements, processes and devices.

Figure 3:
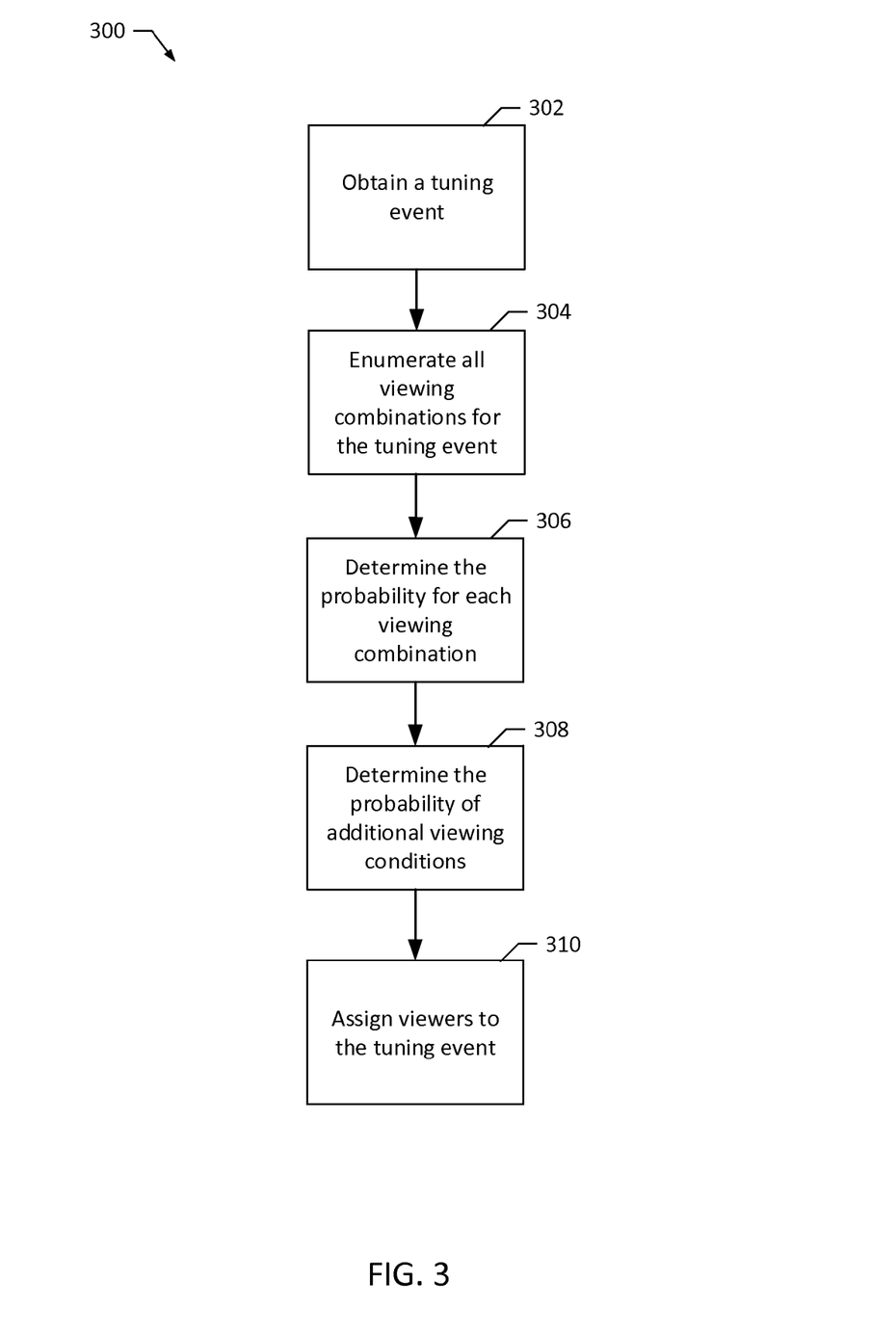
FIG. 3 is a flowchart representative of example machine readable instructions that may be executed to implement the example viewing condition probability calculator of FIGS. 1 and/or 2.

A flowchart representative of example machine readable instructions for implementing the example viewing condition probability calculator 128 of FIG. 1 is shown in FIG. 3. In this example, the machine readable instructions comprise a program for execution by a processor such as the processor 412 shown in the example processor platform 400 discussed below in connection with FIG. 4. The program may be embodied in software stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example viewing condition probability calculator 128 may alternatively be used. For example, the order of execution of the blocks may be changed, and/or some of the blocks described may be changed, eliminated, or combined.

As mentioned above, the example process of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 300 of FIG. 3 begins with an information obtainer, for example the information obtainer 230 of FIG. 2, obtaining tuning event information for a tuning event (Block 302). For each tuning event, the information obtainer 230 obtains the media device used for the tuning event, the media presentation location 106, the people at the media presentation location 106 and the independent probability of viewing for each person at the media presentation location 106. In some examples, the information obtainer 230 may obtain how many people were present at the tuning event. The information obtainer 230 may save the tuning event information in memory or storage, for example the internal storage 228 of FIG. 2, or pass the tuning event information directly to a combination enumerator, for example the combination enumerator 232 of FIG. 2.

The combination enumerator 232 accesses or obtains the tuning event information either directly from the information obtainer 230, or indirectly from storage, for example the internal storage 228. The combination enumerator 232 generates/enumerates a list or table of all the possible viewing combinations using the number of people at the media presentation location 106 (block 304). The combination enumerator 232 may save the list or table of all the possible viewing combinations in memory or storage, for example the internal storage 228 of FIG. 2, or pass the list or table of all the possible viewing combinations directly to a probability calculator, for example the probability calculator 234 of FIG. 2.

The probability calculator 234 obtains the list of viewing combinations from the combination enumerator 232, either directly or indirectly from memory or storage. The list of viewing combinations can be in a list format, a table format, or the like. In some examples, the probability calculator 234 obtains the independent probability of viewing for each person at the media presentation location 106 from the information obtainer 230, either directly or indirectly from memory or storage.

The probability calculator 234 calculates the probability for each of the viewing combinations in the enumerated list, using the independent probability of viewing ($P_i$) for each person at the media presentation location 106 (block 306). The probability for a given viewing combination is calculated as the product of the independent probability of viewing ($P_i$) for each person present in the viewing combination multiplied by the product of one minus the ($P_i$)s for each person not present in the viewing combination. One minus the independent probability of viewing ($P_i$) for a person is equal to the independent probability of that person for not viewing.

The probability calculator 234 uses the probabilities of multiple viewing combinations to determine the probability of a number of additional viewing conditions (block 308). For example, the unconditional probability for a given number of viewers can be determined, the normalized probability for a first one of the viewing combination when a given number of the people N are viewing can be determined, the probability for a given number of people viewing when a first one of the N people is viewing can be determined, and the like. Additional viewing conditions can be calculated.

In some examples the probability of a viewing condition is determined using a first set of viewing combinations that have a common characteristic. The common characteristic may be the number of people watching, specific people watching the tuning event, and the like. The probability of other viewing conditions may be determined using the first set of viewing combinations that have the first common characteristic and a second set of viewing combinations that have a second, different, common characteristic. In some examples, the first and/or the second set of viewing combination may contain only one member.

In some examples, the probability calculator 234 saves the probabilities for different viewing conditions in memory or storage, for example internal storage 228, for later use. In other examples the probability calculator 234 passes the probabilities for different viewing conditions to a viewing assigner, for example the viewing assigner 236 of FIG. 2.

The viewing assigner 236 obtains the probability of a viewing condition either directly from the probability calculator 234, or indirectly from memory or storage, for example the internal storage 228. The viewing assigner 236 assigns audience members to a viewing event based on the probability of a viewing condition. In some example, the viewing assigner 236 assigns the audience member with the highest probability of a viewing condition to the viewing event. In other examples, the viewing assigner 236 compares the probability of a viewing condition to a threshold, and assigns the audience member to the viewing event when the probability of a viewing condition is greater than the threshold. The viewing assigner 236 may display the probability of viewing conditions and/or the assignment of audience members to a viewing condition, on display 238, or may save the assignment of audience members to a viewing condition for use at a later time.

Figure 4:
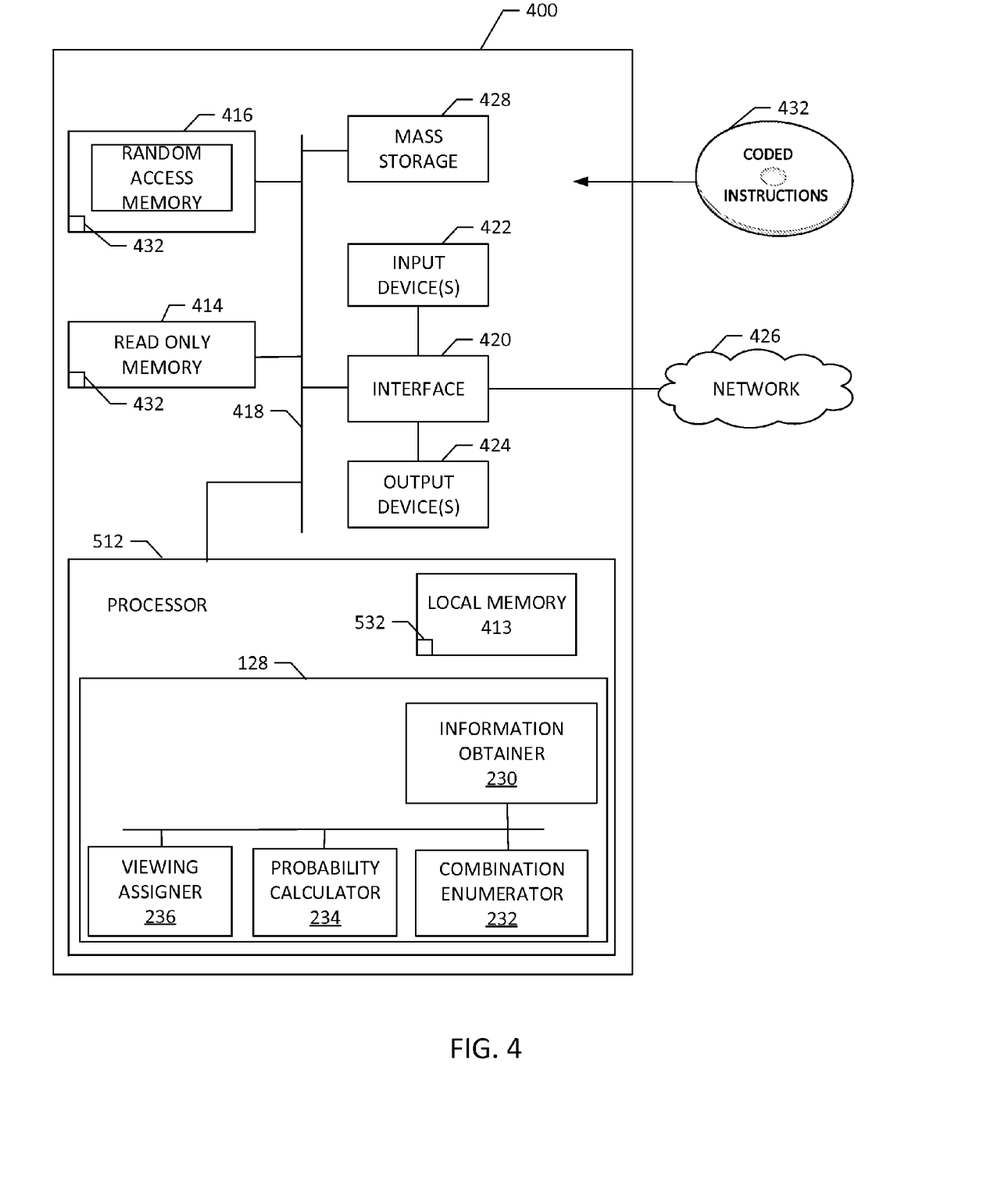
FIG. 4 is a block diagram of an example processor platform 400 capable of executing the instructions of FIG. 3 to implement the example viewing condition probability calculator of FIGS. 1 and/or 2.

FIG. 4 is a block diagram of an example processor platform 1000 capable of executing the instructions of FIG. 3 to implement the viewing condition probability calculator 128 of FIGS. 1 and 2. The processor platform 400 can be, for example, a server, a personal computer, a mobile device (e.g., a cell phone, a smart phone, a tablet such as an iPad™), a personal digital assistant (PDA), an Internet appliance, or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer. In the illustrated example of FIG. 4, the processor 412 is configured via example instructions 432 to implement the example Information obtainer 230, the example combination enumerator 232, the example probability calculator 234 and the example viewing assigner 236 of FIG. 2.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

The coded instructions 432 of FIG. 3 may be stored in the mass storage device 428, in the volatile memory 414, in the non-volatile memory 416, and/or on a removable tangible computer readable storage medium such as a CD or DVD.

From the foregoing, it will appreciate that the above disclosed methods, apparatus and articles of manufacture is more general that previous methods and allows the probability of viewing to be determined for any number of people at a location. The disclosed methods, apparatus and articles of manufacture also can be used in environments with any number of media devices. The disclosed methods, apparatus and articles of manufacture is also independent of the order in which the person is selected for calculating the probability of viewing. In older methods, for example when calculation the probability of viewing using a "by the person viewing" method, the probability of viewing varies depending of the order that the people are selected.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
enumerating, by executing an instruction with a processor, a list of viewing combinations for a tuning event for a number of people at a location, the viewing combinations including a viewing combination in which none of the people are viewing the tuning event;
determining, by executing an instruction with the processor, a probability for each of the viewing combinations using an independent probability of viewing for each one of the people at the location; and
determining, by executing an instruction with the processor, a probability of a viewing condition using the probabilities of a first set of the viewing combinations that have a first common characteristic, the first set of the viewing combinations being a subset of the viewing combinations and the probability of the viewing condition being independent of an order in which each one of the people is selected for calculating the probability of the viewing condition.

2. The method of claim 1, wherein the first common characteristic is a number of viewers.

3. The method of claim 1, wherein the first common characteristic is a first one of the people viewing the turning event.

4. The method of claim 1, further including:
determining, by executing an instruction with the processor, the probability of the viewing condition using the probabilities of a second set of the viewing combinations that have a second common characteristic different from the first common characteristic, the second set of the viewing combinations being a second subset of the viewing combinations.

5. The method of claim 1, wherein the viewing condition is an unconditional probability for a given number of viewers; and
the unconditional probability for the given number of viewers is determined by summing, by executing an instruction with the processor, the probability of each one of the viewing combinations having the given number of viewers.

6. The method of claim 1, wherein the viewing condition is a normalized probability of a first one of the viewing combinations when a given number of the people are viewing the tuning event; and
the normalized probability of the first one of the viewing combinations when the given number of the people are viewing the tuning event is determined by dividing, by executing an instruction with the processor, the probability of the first one of the viewing combinations by a sum of the probability of each of the viewing combinations for the given number of the people viewing the tuning event.

7. The method of claim 1, wherein the viewing condition is a probability for a given number of people viewing the tuning event when a first one of the people is viewing the tuning event; and
the probability for the given number of people viewing the tuning event when the first one of the people is viewing the tuning event is determined by summing, by executing an instruction with the processor, the probability of each one of the viewing combinations for the given number of people viewing the tuning event including the first one of the people viewing the tuning event, divided by a sum of the probability of each one of the viewing combinations with the first one of the people viewing the tuning event.

8. The method of claim 1, wherein the location has more than one media device.

9. The method of claim 1, wherein the first set of the viewing combinations has only one member.

10. The method of claim 1, wherein the location is a panelist household.

11. The method of claim 1, further including:
assigning, by executing an instruction with the processor, a first one of the people to the tuning event based on the probability of the viewing condition.

12. The method of claim 11, wherein the first one of the people is assigned to the tuning event when the probability of the viewing condition exceeds a threshold probability.

13. An apparatus, comprising:
an information obtainer that obtains tuning information for a tuning event;
a combination enumerator that enumerates a list of viewing combinations for the tuning event for a number of people at a location, the viewing combinations including a viewing combination in which none of the people are viewing the tuning event;
a probability calculator that determines a probability for each of the viewing combinations using an independent probability of viewing for each one of the people at the location, the probability calculator to determine a probability of a viewing condition using the probabilities of a first set of the viewing combinations that have a first common characteristic, the first set of the viewing combinations being a subset of the viewing combinations and the probability of the viewing condition being independent of an order in which each one of the people is selected for calculating the probability of the viewing condition, at least one of the information obtainer, the combination enumerator or the probability calculator including hardware.

14. The apparatus of claim 13, wherein the first common characteristic is a number of viewers.

15. The apparatus of claim 13, wherein the first common characteristic is a first one of the people viewing the tuning event.

16. The apparatus of claim 13, wherein the probability of the viewing condition is determined using the probabilities of a second set of the viewing combinations that have a second common characteristic different from the first common characteristic.

17. The apparatus of claim 13, wherein the viewing condition is an unconditional probability for a given number of viewers; and
the unconditional probability for the given number of viewers is determined by summing the probability of each one of the viewing combinations having the given number of viewers.

18. The apparatus of claim 13, wherein the viewing condition is a normalized probability of a first one of the viewing combinations when a given number of the people are viewing the tuning event; and
the normalized probability of the first one of the viewing combinations when the given number of the people are viewing the tuning event is determined by dividing the probability of the first one of the viewing combinations by a sum of the probability of each one of the viewing combinations for the given number of the people viewing the tuning event.

19. The apparatus of claim 13, wherein the viewing condition is a probability for a given number of people viewing the tuning event when a first one of the people is viewing the tuning event; and the probability for the given number of people viewing the tuning event when the first one of the people is viewing the tuning event is determined by summing the probability of each one of the viewing combinations for the given number of people viewing the tuning event including the first one of the people viewing the tuning event, divided by a sum of the probability of each one of the viewing combinations with the first one of the people viewing the tuning event.

20. The apparatus of claim 13, wherein the location has more than one media device.

21. The apparatus of claim 13, wherein the first set of viewing combinations has only one member.

22. The apparatus of claim 13, wherein the location is a panelist household.

23. The apparatus of claim 13, wherein one of the people is assigned to the tuning event based on the probability of the viewing condition.

24. The apparatus of claim 23, wherein the first one of the people is assigned to the tuning event when the probability of the viewing condition exceeds a threshold probability.

25. A tangible computer readable medium comprising computer readable instructions which, when executed, cause a processor to at least:
enumerate a list of viewing combinations for a tuning event for a number of people at a location, the viewing combinations including a viewing combination in which none of the people are viewing the tuning event;
determine a probability for each of the viewing combinations using an independent probability of viewing for each one of the people at the location; and
determine a probability of a viewing condition using the probabilities of a first set of the viewing combinations that have a first common characteristic, the first set of the viewing combinations being a subset of the viewing combinations, the probability of the viewing condition being independent of an order in which each one of the people is selected for calculating the probability of the viewing condition.

26. The storage medium as defined in claim 25, wherein the first common characteristic is a number of viewers.

27. The storage medium as defined in claim 25, wherein the first common characteristic is a first one of the people viewing the tuning event.

28. The storage medium as defined in claim 25, further including instructions which, when executed, cause a processor to at least:
determine the probability of the viewing condition using the probabilities of a second set of the viewing combinations that have a second common characteristic different from the first common characteristic.

29. The storage medium as defined in claim 25, wherein the viewing condition is an unconditional probability for a given number of viewers; and
the unconditional probability for the given number of viewers is determined by summing the probability of each one of the viewing combinations having the given number of viewers.

30. The storage medium as defined in claim 25, wherein the viewing condition is a normalized probability of a first one of the viewing combinations when a given number of the people are viewing the tuning event; and
the normalized probability of the first one of the viewing combinations when the given number of the people are viewing the tuning event is determined by dividing the probability of the first one of the viewing combinations by a sum of the probability of each one of the viewing combinations for the given number of the people viewing the tuning event.

31. The storage medium as defined in claim 25, wherein the viewing condition is a probability for a given number of people viewing the tuning event when a first one of the people is viewing the tuning event; and
the probability for the given number of people viewing the tuning event when the first one of the people is viewing the tuning event is determined by summing the probability of each one of the viewing combinations for the given number of people viewing the tuning event including the first one of the people viewing the tuning event, divided by a sum of the probability of each one of the viewing combinations with the first one of the people viewing the tuning event.

32. The storage medium as defined in claim 25, wherein the location has more than one media device.

33. The storage medium as defined in claim 25, wherein the first set of the viewing combinations has only one member.

34. The storage medium as defined in claim 25, wherein the location is a panelist household.

35. The storage medium as defined in claim 25, further including instructions which, when executed, cause a processor to at least:
assign one of the people to the tuning event based on the probability of the viewing condition.

* * * * *